(12) United States Patent
Ramaiah et al.

(10) Patent No.: US 9,234,982 B2
(45) Date of Patent: Jan. 12, 2016

(54) AIRCRAFT SYSTEMS AND METHODS FOR DISPLAYING WEATHER INFORMATION ALONG A FLIGHT PATH

(75) Inventors: Vinoda Ramaiah, Karnataka (IN); Kiran Gopala Krishna, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 498 days.

(21) Appl. No.: 13/567,697

(22) Filed: Aug. 6, 2012

(65) Prior Publication Data
US 2014/0039734 A1    Feb. 6, 2014

(51) Int. Cl.
    *G01W 1/02*      (2006.01)
    *G08G 5/00*      (2006.01)
    *G01C 23/00*     (2006.01)

(52) U.S. Cl.
    CPC ............. *G01W 1/02* (2013.01); *G01C 23/00* (2013.01); *G08G 5/0013* (2013.01); *G08G 5/0021* (2013.01); *G08G 5/0047* (2013.01); *G08G 5/0052* (2013.01); *G08G 5/0091* (2013.01)

(58) Field of Classification Search
    CPC . G08G 5/0013; G08G 5/0021; G08G 5/0047; G08G 5/0073; G08G 5/0091; G01W 1/02; G01C 23/00
    See application file for complete search history.

(56) References Cited

U.S. PATENT DOCUMENTS

| | | | |
|---|---|---|---|
| 4,642,775 A * | 2/1987 | Cline et al. | 701/528 |
| 4,792,906 A * | 12/1988 | King et al. | 701/5 |
| 5,396,425 A * | 3/1995 | Carlson | 701/14 |
| 6,389,355 B1 * | 5/2002 | Gibbs et al. | 701/467 |
| 6,614,382 B1 * | 9/2003 | Cannaday et al. | 342/26 R |
| 6,647,774 B1 | 11/2003 | Youngquist | |
| 7,463,955 B1 | 12/2008 | Robinson et al. | |
| 7,469,183 B2 * | 12/2008 | Bodin et al. | 701/23 |
| 7,561,067 B2 * | 7/2009 | Matayoshi et al. | 340/973 |
| 7,603,209 B2 | 10/2009 | Dwyer et al. | |
| 7,688,254 B2 | 3/2010 | Khatwa | |
| 7,783,393 B2 | 8/2010 | Tucker et al. | |
| 7,982,658 B2 | 7/2011 | Kauffman et al. | |
| 8,050,864 B2 * | 11/2011 | Schilke et al. | 702/3 |

(Continued)

FOREIGN PATENT DOCUMENTS

| EP | 2290636 A1 | 3/2011 |
|---|---|---|
| EP | 2354805 A1 | 8/2011 |

OTHER PUBLICATIONS

EP Search Report for Application No. 13177898.7, Dated Jun. 25, 2014.

(Continued)

*Primary Examiner* — John Q Nguyen
*Assistant Examiner* — Michael Whalen
(74) *Attorney, Agent, or Firm* — Ingrassia Fisher & Lorenz, P.C.

(57) ABSTRACT

A display system for an aircraft is provided. The system includes a processing unit configured to receive weather information associated with a flight path of a flight plan and to generate display commands based on the weather information. The flight plan includes a first waypoint associated with a first altitude. The system further includes a display device coupled with the processing unit and configured to receive the display commands and to display symbology representing the weather information. The weather information includes first weather information for the first altitude and second weather information at a second altitude, different from the first altitude.

15 Claims, 9 Drawing Sheets

(56) References Cited

U.S. PATENT DOCUMENTS

| | | | |
|---|---|---|---|
| 8,285,427 B2* | 10/2012 | Rogers et al. | 701/3 |
| 8,694,184 B1* | 4/2014 | Boorman et al. | 701/14 |
| 2008/0165051 A1* | 7/2008 | Khatwa | 342/26 B |
| 2009/0112535 A1 | 4/2009 | Phillips | |
| 2009/0177343 A1 | 7/2009 | Bunch et al. | |
| 2010/0030401 A1* | 2/2010 | Rogers et al. | 701/3 |
| 2010/0049382 A1* | 2/2010 | Akalinli et al. | 701/14 |
| 2010/0057275 A1* | 3/2010 | Schilke et al. | 701/14 |
| 2010/0198433 A1* | 8/2010 | Fortier et al. | 701/14 |
| 2010/0315265 A1 | 12/2010 | Smith et al. | |
| 2011/0098871 A1* | 4/2011 | Buchanan et al. | 701/14 |
| 2011/0187588 A1 | 8/2011 | Khatwa et al. | |
| 2011/0276198 A1* | 11/2011 | Khatwa et al. | 701/3 |
| 2011/0282568 A1* | 11/2011 | Khatwa et al. | 701/121 |
| 2012/0232785 A1* | 9/2012 | Wiesemann et al. | 701/423 |
| 2012/0303264 A1* | 11/2012 | Su et al. | 701/416 |
| 2013/0226376 A1* | 8/2013 | Shamasundar | 701/14 |
| 2013/0261850 A1* | 10/2013 | Smith et al. | 701/3 |
| 2014/0222327 A1* | 8/2014 | Burgin et al. | 701/409 |

OTHER PUBLICATIONS

EP Examination Report for Application No. 13177898.7, Dated Jul. 15, 2014.

\* cited by examiner

AIRCRAFT SYSTEMS AND METHODS FOR DISPLAYING WEATHER INFORMATION ALONG A FLIGHT PATH

TECHNICAL FIELD

The present invention generally relates to aircraft display systems, and more particularly relates to aircraft systems and methods for displaying weather information along a flight path.

BACKGROUND

Modern flight deck or cockpit displays for aircraft or other vehicles provide a considerable amount of information, such as vehicle position, navigation and terrain information. In the case of an aircraft, many modern displays include a lateral situation view, generally known as a lateral map display, as a top-down view of the flight plan that may include, for example, a top-down view aircraft symbol, terrain information, political boundaries, navigation aids, waypoint symbols, flight paths, and range rings.

At times, it may be desirable to view other flight-related information in the lateral view, such as, for example, weather information, air traffic information, terminal airspace, special use airspace, instrument procedures, and the like. A user (e.g., a pilot and/or co-pilot) may select one or more of these additional categories of flight-related information for display. However, this information, such as weather information, is typically displayed in a manner that may be difficult to obtain and/or have limited use.

Accordingly, it is desirable to provide weather information to the user in a more relevant and intuitive manner that improves situational awareness and decreases pilot workload. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for an aircraft is provided. The system includes a processing unit configured to receive weather information associated with a flight path of a flight plan and to generate display commands based on the weather information, wherein the flight plan includes a first waypoint associated with a first altitude; and a display device coupled with the processing unit and configured to receive the display commands and to display symbology representing the weather information. The weather information includes first weather information for the first altitude and second weather information at a second altitude, different from the first altitude.

In accordance with another exemplary embodiment, a method is provided for displaying weather information on an aircraft. The method includes receiving a first user selection, via a user interface, of a first waypoint on a flight path of the aircraft; displaying, on a display device, first weather information for the first waypoint at a first altitude; and displaying, on the display device, second weather information for the first waypoint at a second altitude.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein relate to systems and methods for displaying flight information to a pilot or user. In some exemplary embodiments, the systems and methods display weather information to the user, particularly weather information such as winds aloft and temperature information at selected altitudes along the flight path on vertical and/or lateral situation displays. Accordingly, the user may have immediate and accurate weather information to avoid undesirable weather and/or to adjust flight plans based on weather.

Figure 1:
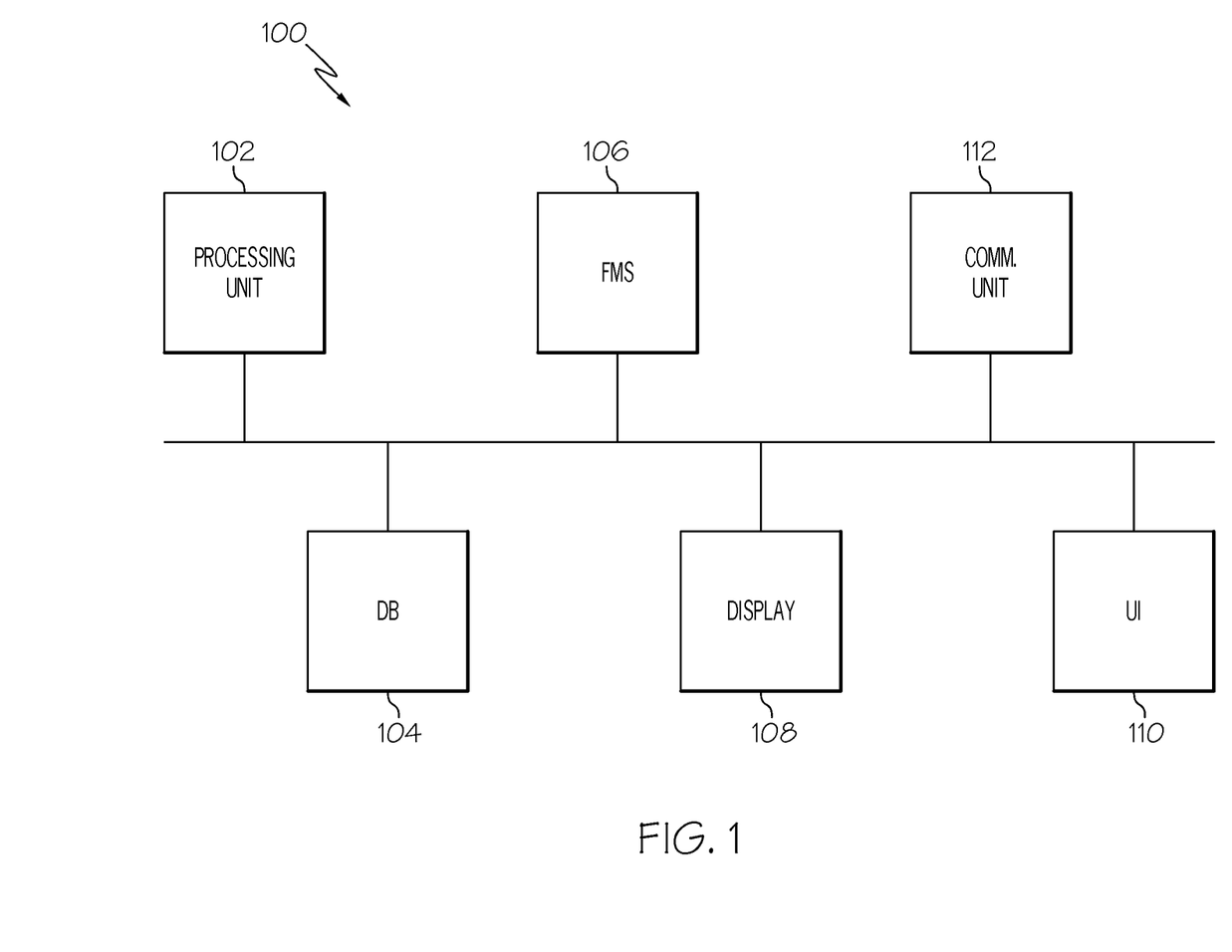
FIG. 1 is a block diagram of an aircraft display system in accordance with an exemplary embodiment.

FIG. 1 depicts a block diagram of an exemplary aircraft visual display system 100 for displaying weather information. In the exemplary embodiment shown, the system 100 includes a processing unit 102, a database 104, a flight management system 106, a display device 108, a user interface 110, and a communications unit 112. Although the system 100 appears in FIG. 1 to be arranged as a single system on a data communications bus or systems bus, the system 100 is not so limited and can also include an arrangement whereby one or more of the processing unit 102, the database 104, the flight management system 106, the display device 108, the user interface 110, and communications unit 112 are separate components or subcomponents of another system located either onboard or external to an aircraft. Also, for example, the system 100 can be arranged as an integrated system (e.g., aircraft display system, primary flight display system, a head up display with Synthetic Vision Systems (SVS) or Enhanced Vision System (EVS) as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 may be utilized in an aircraft, such as a helicopter, airplane, or unmanned vehicle. Moreover, exemplary embodiments of the system 100 may also be utilized in spacecraft, ships, submarines, and other types of vehicles. For simplicity, embodiments are described below with reference to "aircraft."

The processing unit 102 may be a computer processor associated with a primary flight display or other type of aircraft display. Generally, the processing unit 102 receives and/or retrieves inertial, avionics, navigation and flight management information, including weather information (e.g., from the flight management system 106 or communications unit 112), and landing, target and/or terrain information (e.g., from database 104). The processing unit 102 may function as a graphics display generator to generate display commands based on algorithms or other machine instructions stored in the processing unit 102 or in separate memory components. The display commands may represent navigation and control information such as a zero pitch reference line, heading indicators, tapes for airspeed and altitude, terrain information, flight path information, required navigation performance (RNP) information, and any other information desired by a flight crew. As discussed in further detail below, the processing unit 102 additionally calculates and generates display commands representing weather information. The processing unit 102 then sends the generated display commands to a display device (e.g., the display device 108). More specific functions of the processing unit 102 will be discussed below.

Database 104 is coupled to processing unit 102 and may be a memory device (e.g., non-volatile memory, disk, drive, tape, optical storage device, mass storage device, etc.) that stores digital flight information as either absolute coordinate data or as a function of an aircraft's position. Database 104 may also include, for example, a terrain database, which includes the locations and elevations of natural and manmade terrain. Database 104 may additionally include other types of information, such as information relating to the aircraft and/or weather information. The data may be used to compare aircraft position with various aspects of the flight plan and terrain environment to subsequently generate a synthetic view relative to the aircraft, as discussed below. Data in the database 104 may be uploaded prior to flight or received from external sources, such as an airport transmitter or onboard sensors.

Database 104 may further include aircraft data obtained from the Federal Aviation Administration (FAA) and aircraft manufacturers, such as from aircraft flight manual. The aircraft data may also include aircraft characteristics as a function of, for example, aircraft weight, with corrections based on, for example, wind direction, runway slope, runway surface condition, atmospheric altitude and outside temperature.

The flight management system 106 is coupled to the processing unit 102 and may provide navigation data associated with the aircraft's current position and flight direction (e.g., heading, course, track, etc.) to the processing unit 102. The navigation data provided to the processing unit 102 may also include information about the aircraft's airspeed, altitude, pitch, flight path, intended destination, takeoff and landing information, and other important flight information. For example, the flight management system 106 may generate a flight plan for the aircraft that includes segments between waypoints forming a flight path to a destination. In exemplary embodiments, the flight management system 106 may include any suitable position and direction determination devices that are capable of providing the processing unit 102 with at least an aircraft's current position, the real-time direction of the aircraft in its flight path, the waypoints along the flight path, the weather along the flight path, and other important flight information (e.g., elevation, pitch, airspeed, altitude, attitude, etc.). Information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying flight information or other data associated with operation of the aircraft, including various types of computer generated symbols and information representing at least weather, pitch, heading, flight path, airspeed, altitude, runway information, waypoints, targets, obstacle, terrain, and RNP data in an integrated, multi-color or monochrome form. Using data retrieved (or received) from the flight management system 106, database 104, or communications unit 112, the processing unit 102 executes one or more algorithms (e.g., implemented in software) for determining the position of the various types of desired information on the display device 108. As noted above, the processing unit 102 then generates display commands representing this data, and sends display commands to the display device 108. The display device 108 and/or processing unit 102 may include a graphics display generator for generating the appropriate symbology on the screen of the display device 108, as discussed in greater detail below.

In this embodiment, the display device 108 is an aircraft flight display located within a cockpit of the aircraft. It should be appreciated that, in practice, the display device 108 may be located outside the aircraft (e.g., on the ground as part of an air traffic control center or another command center) and communicatively coupled to the flight management system 106. Any suitable type of display medium capable of visually presenting multi-colored or monochrome flight information for a pilot or other flight crew member may be provided, such as, for example, various CRT, flat-panel, and other types of display systems (e.g., LCDs, OLED displays, plasma displays, projection displays, HDDs, HUDs, etc.).

In general, the user interface 110 is coupled to the processing unit 102 and may also be located within the cockpit of the aircraft and adapted to allow a user (e.g., pilot, co-pilot, or crew member) to interact with the system 100. Such a user interface may be realized as a keypad, touchpad, keyboard, mouse, touchscreen, joystick, microphone, or another suitable device adapted to receive input from a user. In one exemplary embodiment, the user interface 110, display device 108, and processing unit 102 may cooperate to present interactive widgets or elements that enable the user to, among other things, select or otherwise interact with items or elements on the display device 108, as described in greater detail below. Such interactive widgets or elements may include selectable labels, selectable flight levels or altitudes, text boxes, and pop-up menus, boxes, and notifications.

The system 100 may receive data from a number of internal data sources (e.g., the flight management system 106 and/or database 104) and external data sources, for example, via the communications unit 112. The communications unit 112 may be, for example, an XM datalink unit that provides, among other information, weather data, including winds aloft through an XM WX satellite weather datacasting service. Such weather information may be provided directly to the processing unit 102 or to the flight management system 106 or database 104 and accessible to the processing unit 102, as necessary or desired. In other embodiments, the communications unit 112 may receive weather information from any type of weather service. Weather information may include, for example, winds aloft data in form of wind direction and magnitude as well as temperature. For example, weather data may be updated every hour and broadcast at 5-15 minute intervals; however, this timing may vary. Alternatively, the weather data, including winds aloft data and temperature data may be provided by sensors or other sources. In general, the communications unit 112 may receive, or the processing unit 102 may otherwise determine, weather information at various altitudes for waypoints along the flight path of the aircraft. The communications unit 112 may also communicate with a control center, such as Air Traffic Control (ATC), to request clearances and/or modifications to the flight plan. As described below, the communications unit 112 may interact with the processing unit 102, display device 108, and/or user interface 110 to send automated or semi-automated messages requesting altitude clearances and/or modifications to the flight plan.

In an exemplary embodiment and discussed in greater detail below, the system 100 may operate to provide information to the user related to the weather information discussed above, particularly winds aloft and temperature information. In particular, the processing unit 102 accesses or otherwise references data from the flight management system 106, database 104, user interface 110, and/or communications unit 112 for flight information. The processing unit 102 generates graphical symbology representing the terrain information, flight plan information, and weather information to the user on the display device 108. As such, the user is made aware of the weather information relative to the flight plan, as described in greater detail below.

Figure 2:
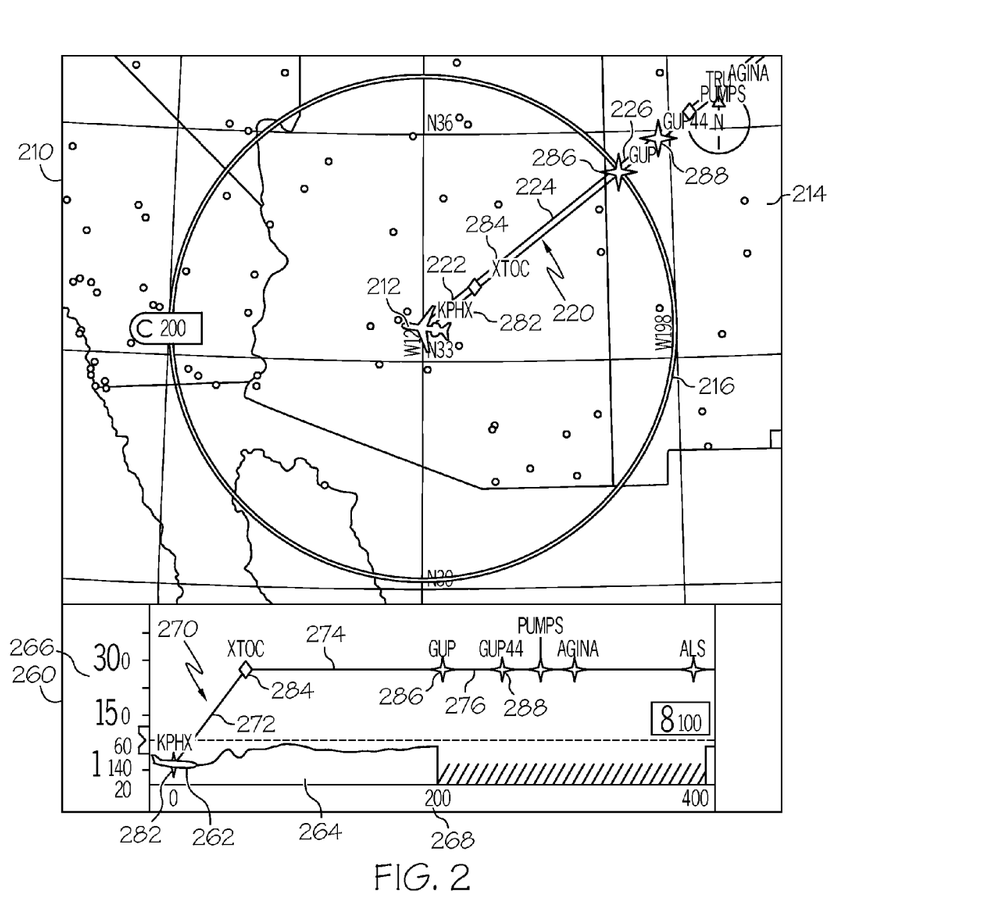
FIG. 2 is a first representative image generated by the aircraft display system of FIG. 1 in accordance with an exemplary embodiment.

FIG. 2 is a visual display 200 generated by the system 100 of FIG. 1 in accordance with a first exemplary embodiment. As such, FIG. 1 is referenced in the discussion of FIG. 2 below. The visual display 200 may be produced, for example, on the display unit 180 based on signals from the processing unit 102, database 104, flight management system 106, display device 108, user interface 110, and communications unit 112.

In the depicted embodiment, the visual display 200 shows, among other things, computer generated symbols representing a lateral situation display view (or navigation or map view) 210 and a vertical situation display view (or elevation view) 260. The lateral situation display view 210 is generally a top-down view of the aircraft environment and includes graphical symbols representing the position of the aircraft 212, terrain 214, and range rings 216. The lateral situation display view 210 further depicts the lateral flight plan 220 formed by lateral segments 222, 224, 226 between waypoints 282, 284, 286, 288 (e.g., waypoints PHX, XTOC, GUP, GUP4). The aircraft 212 and terrain 214 are positioned and/or rendered within the lateral situation display view 210 to accurately reflect the real-world positioning of the aircraft 212 relative to the terrain 214 and lateral flight plan 220. In this regard, the lateral situation display view 210 may be updated or refreshed to remain centered on the aircraft 212 as the aircraft travels along the lateral flight plan 220.

The vertical situation display view 260 is generally a side or elevation view of the aircraft environment and is generally synchronized with the positional view on the lateral situation display view 210. As such, the vertical situation display view 260 includes graphical symbols representing the position of the aircraft 262 and terrain 264 relative to altitude 266, indicated on a vertical scale, and distance 268, indicated on a horizontal scale. The vertical situation display view 260 further depicts the vertical flight plan 270 formed by vertical segments 272, 274, 276 between waypoints 282, 284, 286, 288 (e.g., waypoints PHX, XTOC, GUP, GUP4 corresponding to the waypoints depicted in the lateral situation display view 210). As such, in the example shown in FIG. 2, the aircraft is at an altitude of 1140 feet at waypoint (PHX) 282 and is expected to climb to 3000 feet by waypoint (XTOC) 284 and maintain 3000 feet until waypoint (GUP) 286, which is 200 nautical miles away. Other types of symbology may be provided. In this regard, the vertical situation display view 260 may be updated or refreshed as the aircraft travels along the vertical flight plan 270. As described in greater detail below, the visual display 200 selectively displays weather information on the lateral situation display view 210 and/or the vertical situation display view 260.

Figure 3:
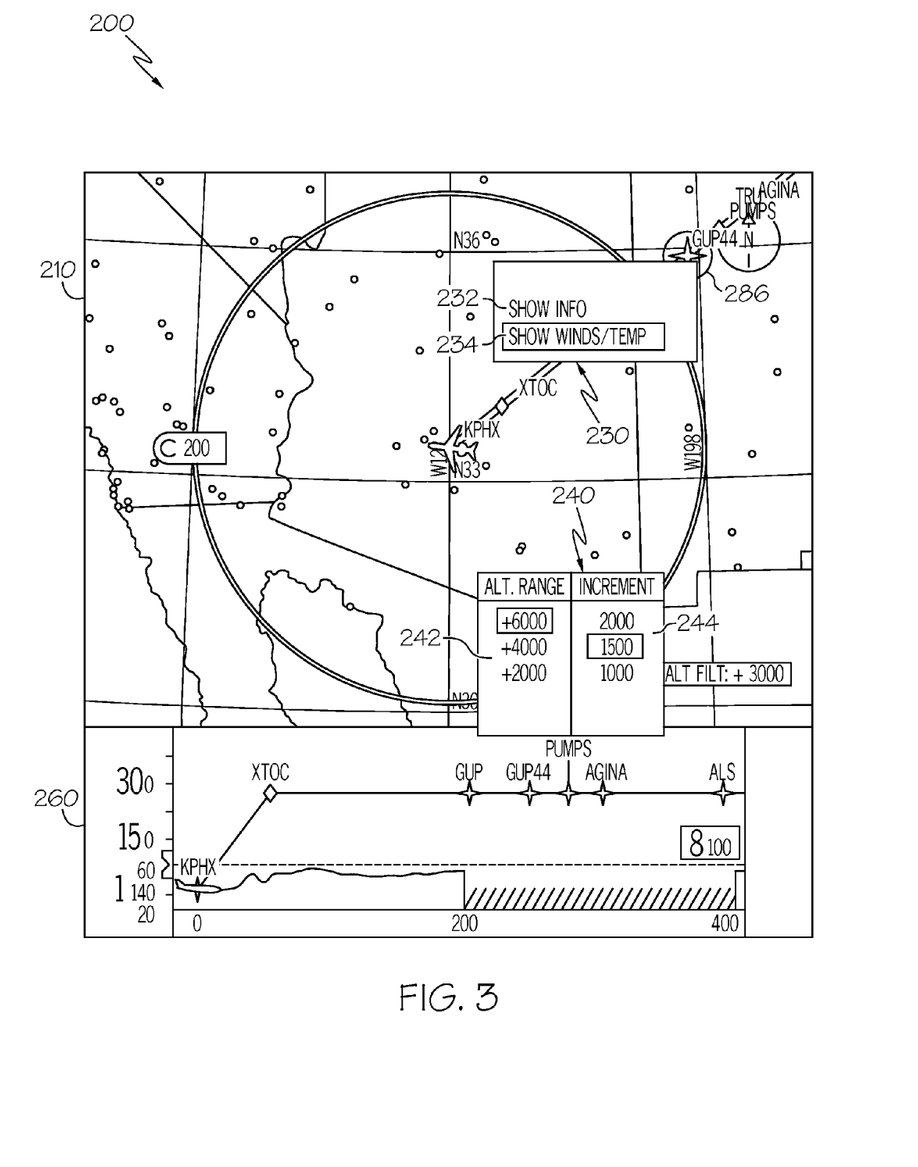
FIG. 3 is a second representative image generated by the aircraft display system of FIG. 1 in accordance with an exemplary embodiment.

FIG. 3 is a second representative image generated by the system 100 of FIG. 1 in accordance with an exemplary embodiment. As in FIG. 2, FIG. 3 depicts the lateral situation display view 210 and vertical situation display view 260. FIG. 3 particularly illustrates a user accessing weather information, particularly weather information associated with a waypoint along the flight plan. As such, in the example illustrated by FIG. 3, if the user desires weather information at a particular waypoint (e.g., waypoint (GUP) 286), the user utilizes a user interface (e.g. user interface 110) to select the waypoint (GUP) 286 on the lateral situation display view 210. In general, any of the waypoints or nonwaypoint positions along the flight path may be selected by the user. In further embodiments, the waypoint may be selected on the vertical situation display view 260.

In response to a waypoint selection, the visual display 200 provides a first menu 230 (e.g., a pop-up or task menu on the vertical situation display view 260 and/or the lateral situation display view 210) with a number of selections 232, 234. Selection 232 may include a "show info" selection, and selection 234 may include a "show winds/temp" selection. Other selections may be provided in the first menu 230, and selection 232 is discussed in greater detail below. To access weather information, the user selects the show winds/temp selection 234. In response, the vertical situation display view 260 may display weather information associated with the selected waypoint (e.g. waypoint (GUP) 286), as subsequently described.

In one exemplary embodiment, the visual display 200 may provide the weather information with respect to a number default altitudes at default altitude increments. However, in the depicted embodiment, the user may select the altitudes and increments for displaying the weather information. As an example, upon making selection 234 to view the weather information for a designated waypoint, the visual display 200 may enable a second menu 240 (e.g., a pop-up or task menu on the lateral situation display view 210 and/or the vertical situation display view 260). The second menu 240 includes an altitude scale 242 and an increment scale 244. The second menu 240 may be referred to as an "altitude filter" that determines the content and display characteristics of the weather information discussed below. The altitude scale 242 enables a user to select the maximum altitude associated with the desired weather information, and the increment scale 244 enables a user to select the increments associated with the desired weather information. In the depicted example of FIG. 3, the user may request weather information up to altitudes of 4500 feet, 6000 feet, or increments in between to be shown on the vertical situation display view 260. Additionally, in the depicted example of FIG. 3, the user may request weather information with altitude increments of 1500 feet, 2000 feet, and 3000 feet. The altitudes and increments available for selection in the second menu 240 may be based on a number of factors, including current altitude and/or the predetermined altitude associated with the desired waypoint. For example, the predetermined altitude on the flight plan for the selected waypoint (GUP) 286 is 3000 feet, as noted in the description of FIG. 2. As such, the menu 240 lists altitudes greater than 3000 feet to provide a range of altitude selections. In other examples, the menu 240 may list altitudes less than the predetermined altitude based on the situation, typical flight characteristics, and anticipated flight plan modifications. The altitudes and increments listed in menu 240 may be absolute altitudes or relative to a current altitude. In general, any number of altitude levels or values may be displayed on the menu 240 and selected by the user. In the example shown in FIG. 3 and discussed below, the user selects 6000 feet on the altitude scale 242 and 1500 feet on the increment scale 244.

Figure 4:
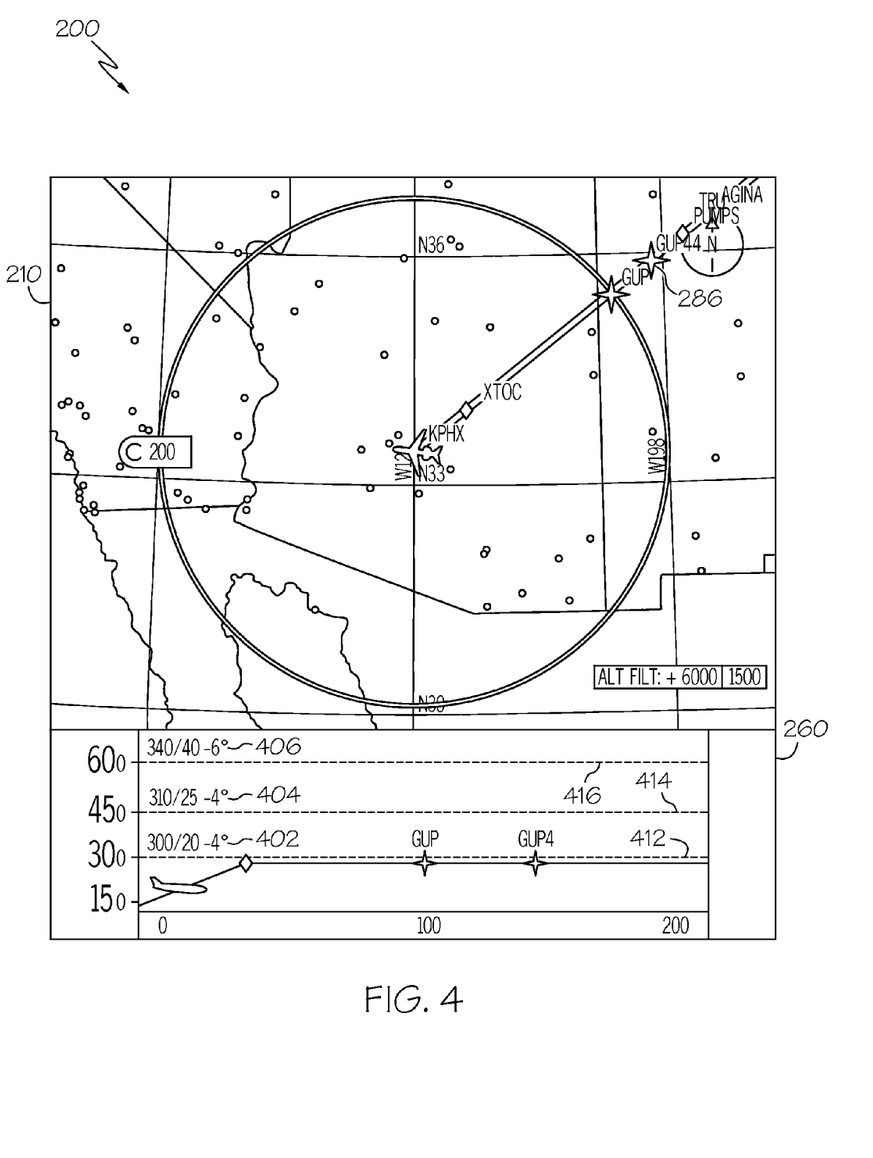
FIG. 4 is a third representative image generated by the aircraft display system of FIG. 1 in accordance with an exemplary embodiment.

FIG. 4 is a third representative image generated by the system 100 of FIG. 1 in accordance with an exemplary embodiment. In particular, FIG. 4 is an image of the visual display 200 discussed above following the selections in menus 230 and 240 of FIG. 3.

As shown, the visual display 200 provides weather information (weather information 402, 404, 406) on the vertical situation display view 260. In the depiction of FIG. 4, the visual display 200 provides weather information 402, 404, 406 in the form of wind direction, wind speed, and temperature at designated altitudes. Although the weather information may be expressed in any suitable units, in the depicted embodiments, wind direction is provided in degrees as an orientation from true North; wind speed is provided in knots; and temperature is provided in degrees Celsius. As noted above, based on the selections referenced in the discussion of FIG. 3, the weather information 402, 404, 406 is displayed from the waypoint altitude up to 6000 feet at increments of 1500 feet. The altitude levels are represented by horizontal lines 412, 414, 416 on the vertical situation display view 260.

As such, the vertical situation display view 260 provides weather information 402 at an altitude of 3000 feet, which is the altitude associated with the selected waypoint (GUP) 286. Additionally, the vertical situation display view 260 additionally displays weather information 404 at an altitude of 4500 feet, and weather information 406 at an altitude of 6000 feet. For example, at the altitude designated for the selected waypoint (GUP) 286, e.g., 3000 feet, the wind direction is 300°, the wind speed is 20 knots, and the temperature is −4°, and at 6000 feet, the wind direction is 340°, the wind speed is 40 knots, and the temperature is −6°. As such, in addition to the weather information associated with the selected waypoint, the vertical situation display view 260 additionally displays weather information 404, 406 for other selected or otherwise predetermined altitudes to enable comparison relative to the weather information 402 at the predetermined waypoint altitude. Accordingly, the pilot or user is aware of weather information 402, 404, 406 along the flight path at various altitudes, as opposed to a generalized weather report for the overall area, merely a weather report for a waypoint, or merely a weather report at a single predetermined waypoint altitude. Additionally, the weather information 402, 404, 406 is displayed on the vertical situation display view 260 with the vertical profile of the flight plan as well as the lateral situation display view 210 on a single display image.

The weather information 402, 404, 406 may be depicted in any suitable color, transparency, or manner. In one exemplary embodiment, the weather information 402, 404, 406 may be depicted in manner that indicates the temporal nature or validity of the information. For example, if the weather information 402, 404, 406 is white, the weather information is current, and if the weather information 402, 404, 406 is gray, the weather information may have expired.

Figure 5:
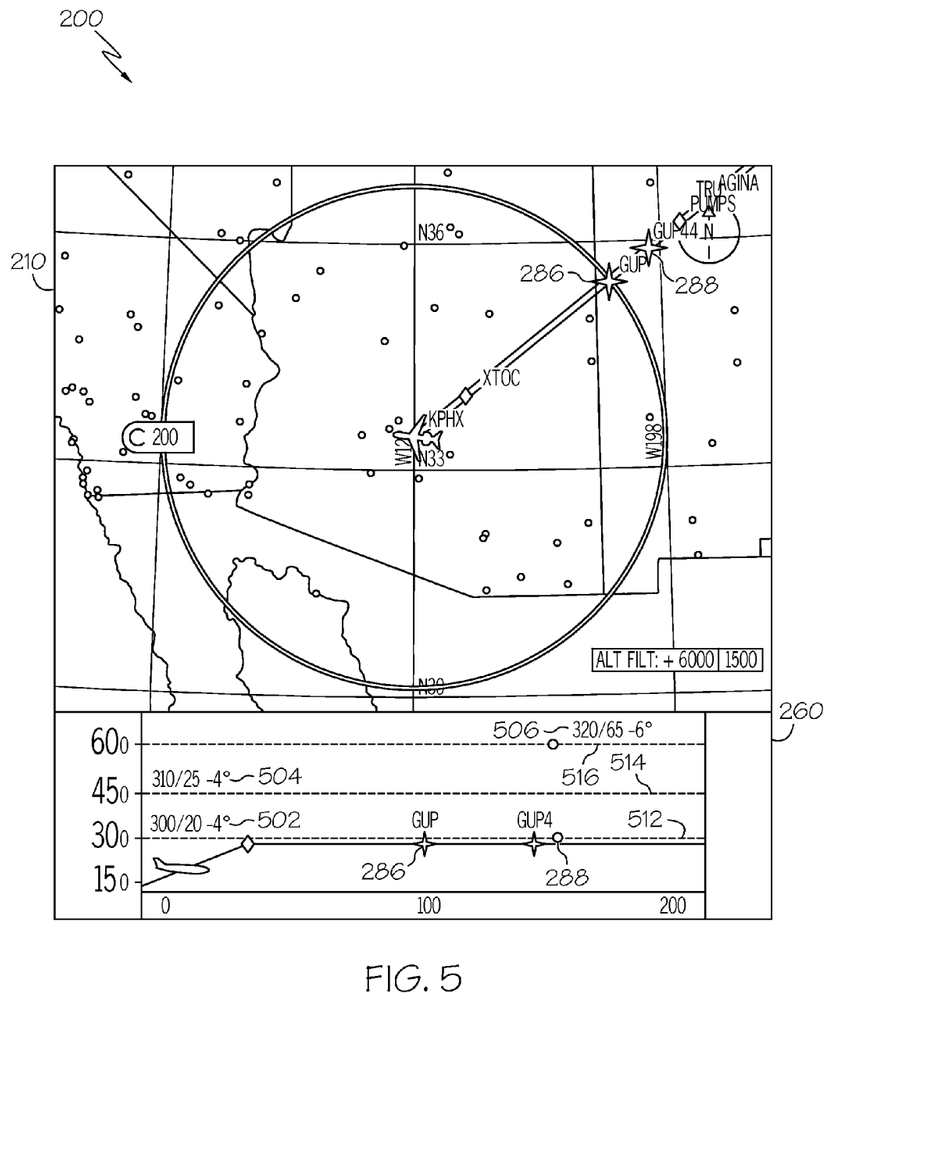
FIG. 5 is a fourth representative image generated by the aircraft display system of FIG. 1 in accordance with an exemplary embodiment.

FIG. 5 is a fourth representative image generated by the system 100 of FIG. 1 in accordance with an exemplary embodiment. In particular, FIG. 5 is the visual display 200 discussed above following the representative image of FIG. 4.

As shown, the visual display 200 provides weather information (weather information 502, 504, 506) on the vertical situation display view 260. In the depiction of FIG. 5, the visual display 200 provides weather information 502, 504, 506 in the form of wind direction, wind speed, and temperature at designated altitudes, which are indicated by lines 512, 514, 516. The weather information 502 is the weather information at an altitude of 3000 feet, which is the altitude associated with the selected waypoint (GUP) 286, and weather information 504 is the weather information at an altitude of 4500 feet. The weather information 502, 504 generally corresponds to similar weather information 402, 404 as shown in FIG. 4. However, in FIG. 5, the weather information 506 is the weather information associated with a further or additional position along the flight plan. For example, the user may indicate a desire to view such information by selecting (e.g., "clicking on" with user interface 110 of FIG. 1) a horizontal position along an altitude line 516 associated with one of the displayed altitudes. For example, the weather information 506 is associated with a different waypoint (e.g., a waypoint other than waypoint (GUP) 286), such as waypoint (GUP4) 288 or any location along the flight plan. In general, the user may select any altitude and/or lateral position along the flight path. As such, the vertical situation display view 260 provides weather information 502 at an altitude of 3000 feet at waypoint (GUP) 286, weather information 504 at an altitude of 4500 feet at waypoint (GUP) 286, and weather information 506 at an altitude of 6000 feet at or near waypoint (GUP4) 288 along the flight plan.

Figure 6:
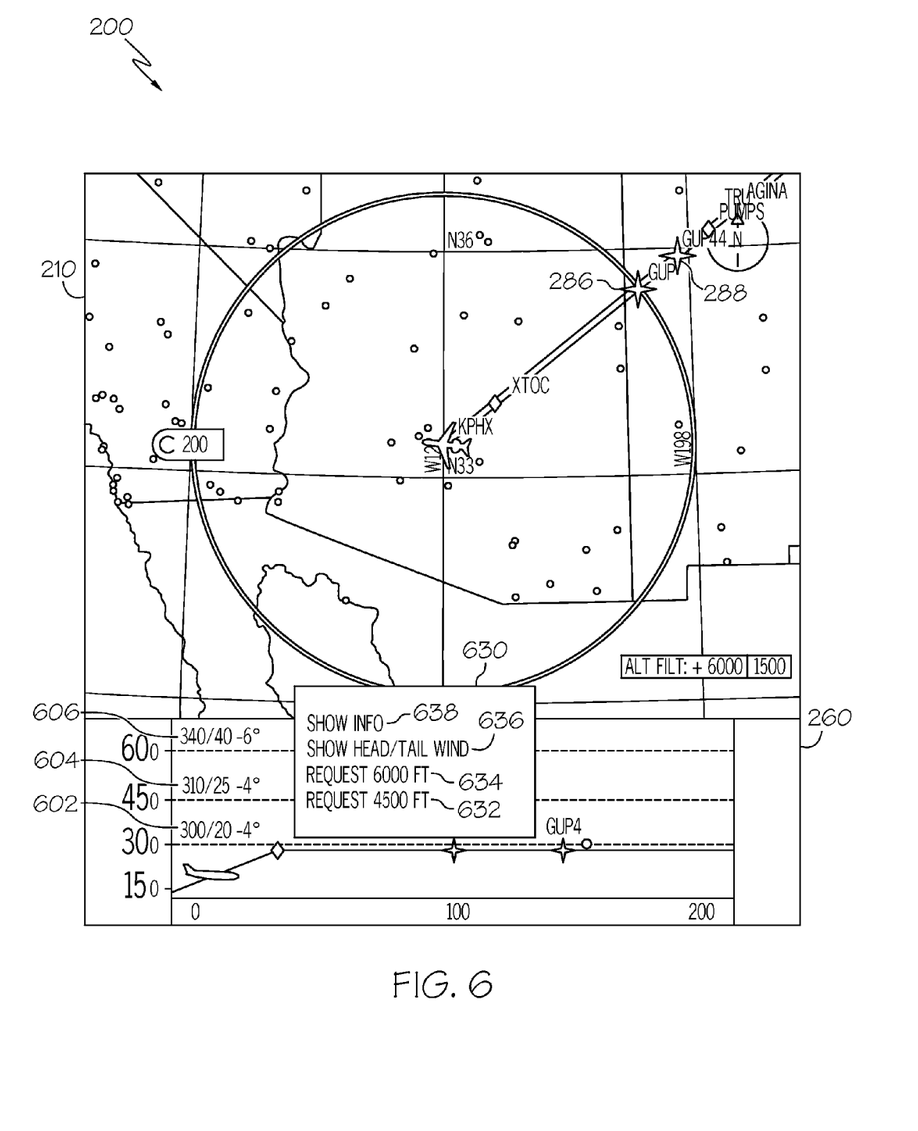
FIG. 6 is a fifth representative image generated by the aircraft display system of FIG. 1 in accordance with an exemplary embodiment.

FIG. 6 is a fifth representative image generated by the system 100 of FIG. 1 in accordance with an exemplary embodiment. In particular, FIG. 6 is the visual display 200 discussed above following the representative image of FIG. 4.

As shown, the visual display 200 provides weather information (weather information 602, 604, 606) on the vertical situation display view 260. In the depiction of FIG. 6, the visual display 200 provides weather information 602, 604, 606 in the form of wind direction, wind speed, and temperature at designated altitudes. In this example, the weather information 602, 604, 606 generally corresponds to the weather information 402, 404, 406 displayed in FIG. 4. FIG. 6 additionally illustrates a menu 630 (e.g., a pop-up or task menu on the vertical situation display view 260 and/or the lateral situation display view 210) that enables a predetermined communication message to a control center, such as an Air Traffic Control (ATC). The menu 630 may be activated in any suitable manner, including by clicking on the horizontal altitude lines of the vertical situation display view 260. The menu 630 includes selections 632, 634 corresponding to the altitudes displayed on the vertical situation display view 260. Selections 632, 634 initiate a message requesting a modification of the flight plan or requesting clearance from the ATC for a flight level change to proceed at the corresponding altitude. For example, selecting selection 632 initiates a message requesting altitude clearance from 3000 feet to 4500 feet at the respective waypoint (GUP) 286, and selecting selection 634 initiates a message requesting altitude clearance from 3000 feet to 6000 feet at the respective waypoint (GUP) 286. The message may be, for example, a Controller Pilot Data Link Communications (CPDLC) message generated automatically to be down linked to the ATC for clearance. The pilot or user may make such a selection 632, 634, as desired, if the weather associated with those altitudes is more advantageous than the current altitude of the waypoint. For example, if one of the altitudes has a tailwind or a reduced headwind, the aircraft may save fuel or time by flying at that altitude. Menu 630 additionally may include a selection 636 to show head/tail wind information and a selection 638 to request additional information about the weather, as respectively described below in reference to FIGS. 7 and 8.

Figure 7:
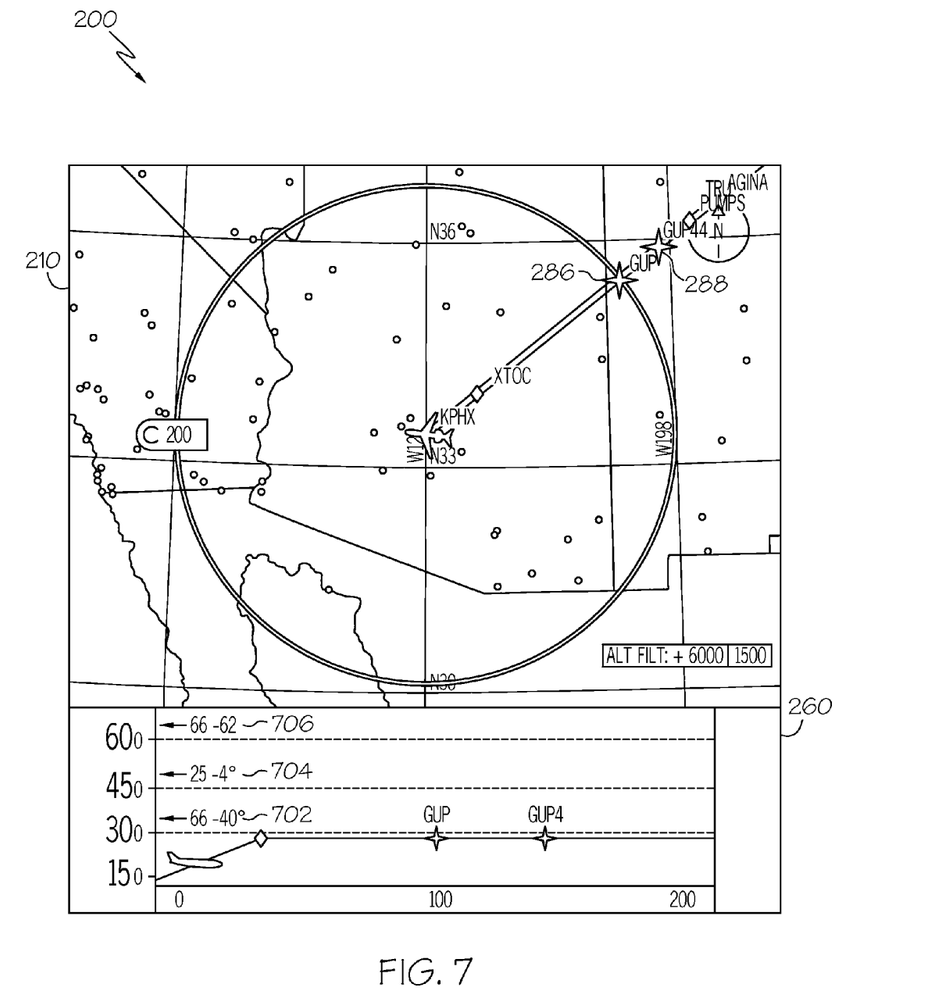
FIG. 7 is a sixth representative image generated by the aircraft display system of FIG. 1 in accordance with an exemplary embodiment.

FIG. 7 is a sixth representative image generated by the system 100 of FIG. 1 in accordance with an exemplary embodiment. In particular, FIG. 7 is the visual display 200 discussed above following the representative image of FIG. 6.

As shown, the visual display 200 provides weather information (weather information 702, 704, 706) on the vertical situation display view 260. In the depiction of FIG. 7, the visual display 200 provides weather information 702, 704, 706 in the form of wind direction, wind speed, and temperature at designated altitudes. As compared to embodiments discussed above, the wind direction of the weather information 702, 704, 706 is in the form of an arrow instead of degrees. The arrows that form part of the weather information 702, 704, 706 provide the direction of the wind relative to the aircraft as it flies along the designated flight path. An arrow pointing to the left indicates that the respective wind is a head wind, and an arrow pointing to the right indicates that the respective wind is a tail wind. As such, the user does not need to mentally determine the relative wind direction, thereby further reducing workload. In one exemplary embodiment, the arrows in the weather information 702, 704, 706 may be selected for display with a pop-up or task menu, such as the menu 630 depicted in FIG. 6, upon which selection of the "show head/tail wind" selection 636 initiates the view of FIG. 7.

Figure 8:
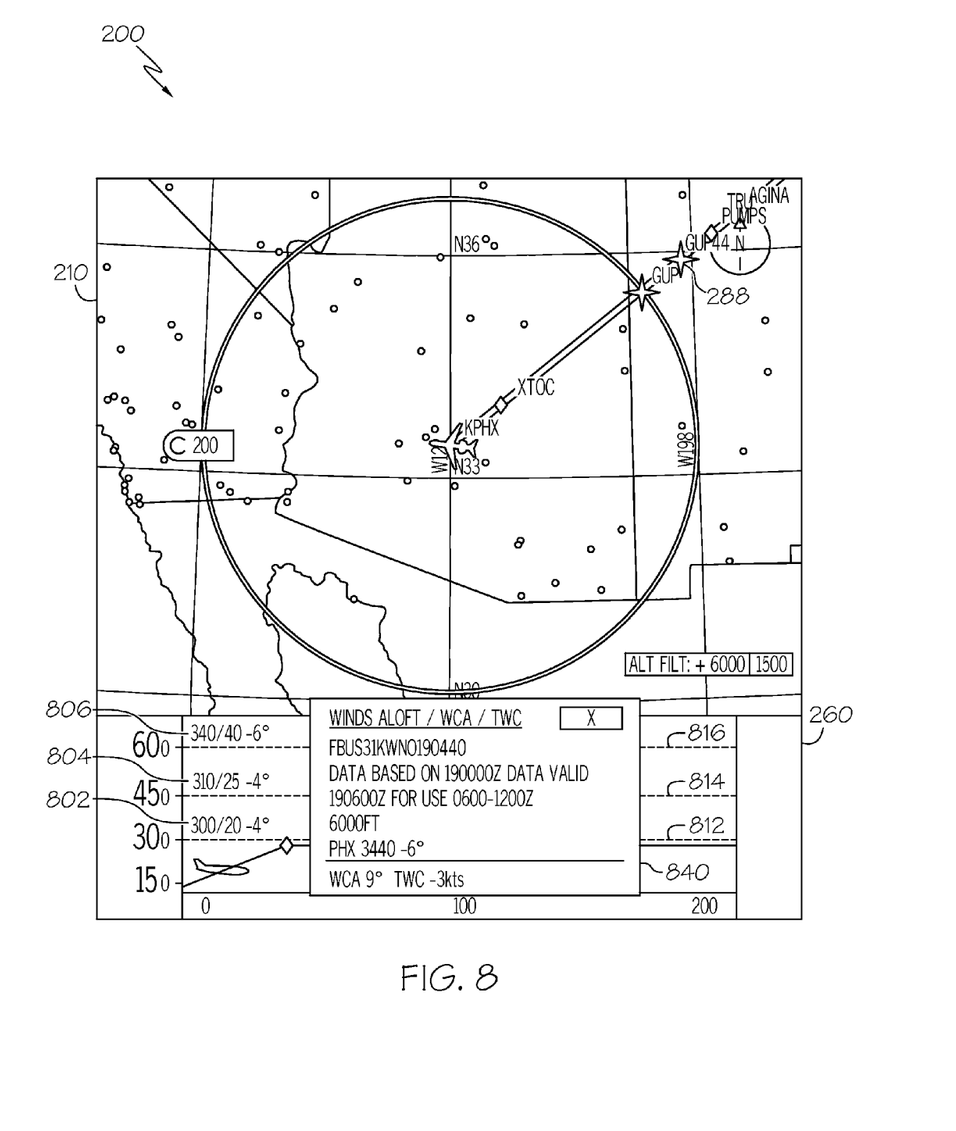
FIG. 8 is a seventh representative image generated by the aircraft display system of FIG. 1 in accordance with an exemplary embodiment.

FIG. 8 is a seventh representative image generated by the system 100 of FIG. 1 in accordance with an exemplary embodiment. In particular, FIG. 8 is the visual display 200 discussed above following the representative image of FIG. 6.

As shown, the visual display 200 provides weather information (weather information 802, 804, 806) on the vertical situation display view 260, generally corresponding to the weather information 602, 604, 606 of FIG. 6. As depicted in FIG. 6, the menu 630 includes selection 638, the selection of which initiates the view of FIG. 8. In the depiction of FIG. 8, the visual display 200 provides additional information 840 about the weather in the form of a pop-up box on the vertical situation display view 260. The additional information 840 may include, for example, textual winds aloft information, including the wind correction angle (WCA) and the track wind component (TWC). The information 840 may be accessed by clicking the appropriate altitude line 812, 814, 816. In general, WCA is the angle between the course and the heading that is required for the aircraft to track that course when there is wind, and TWC is the speed component attributed to the tailwind. For example, in FIG. 8, the WCA is 9° and the TWC is –3 knots, which indicates that the wind is a headwind.

Figure 9:
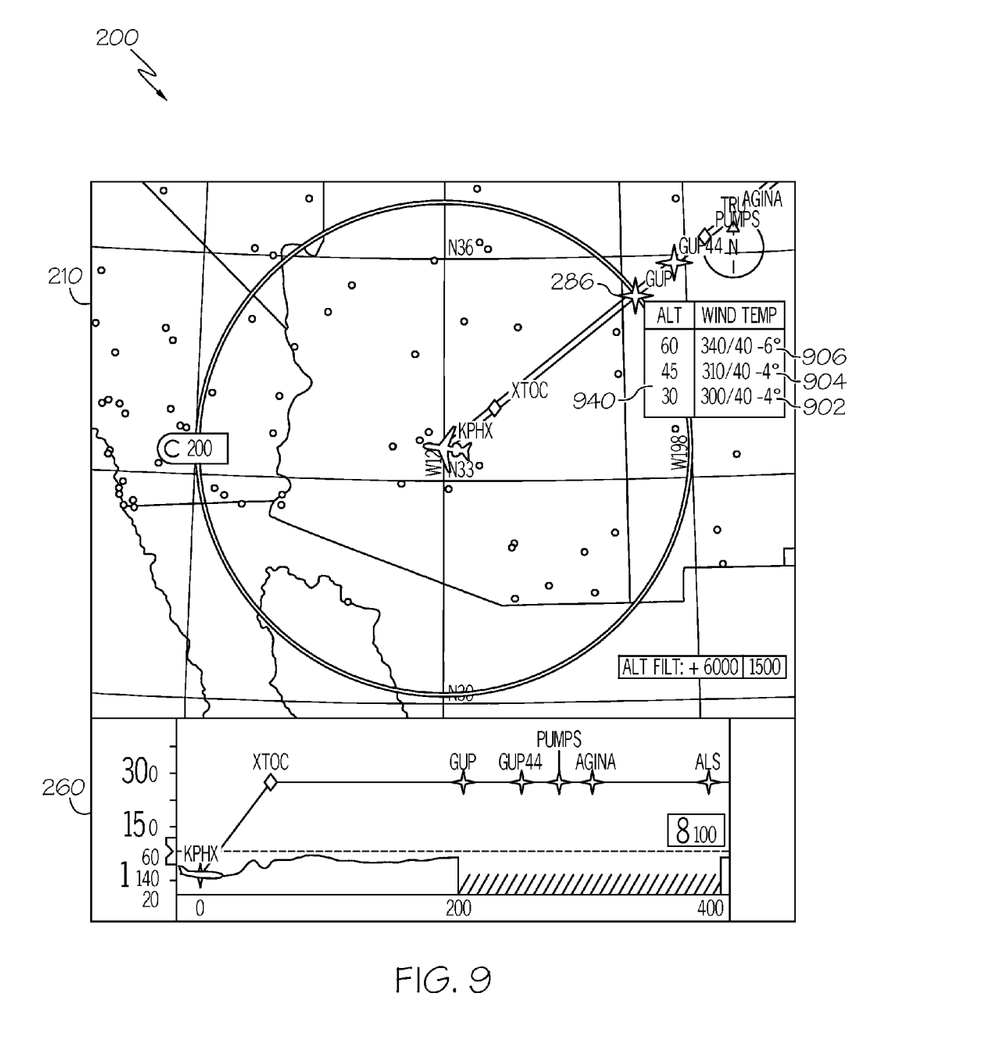
FIG. 9 is an eighth representative image generated by the aircraft display system of FIG. 1 in accordance with an exemplary embodiment.

FIG. 9 is an eighth representative image generated by the system 100 of FIG. 1 in accordance with an exemplary embodiment. In particular, FIG. 9 may correspond to the visual display 200 discussed above following the selections in menus 230 and 240 of FIG. 3. In this embodiment, the visual display 200 provides weather information (weather information 902, 904, 906) on the lateral situation display view 210 at the selected waypoint (GUP) 286. In the depiction of FIG. 9, the visual display 200 provides weather information 902, 904, 906 in the form of wind direction, wind speed, and temperature at the designated altitudes. The altitudes depicted on the lateral situation display view 210 may be indicated by list 940. Although FIG. 9 only depicts the weather information 902, 904, 906 for the selected waypoint (GUP) 286, in other embodiments, corresponding weather information at selected altitudes for any or all of the waypoints may be provided. The content associated with the listed altitudes 940 and corresponding weather information 902, 904, 906 may be selected or otherwise predetermined from a menu such as menu 240 in FIG. 3 and displayed on the lateral situation display view 210, as shown in FIG. 9.

Although a system 100 and visual displays 200 are depicted in FIGS. 1-9, exemplary embodiments may additionally include a method for displaying weather information on an aircraft. As an example, and additionally referring to FIG. 2, the method may include receiving a first user selection, via a user interface, of a first waypoint on a flight path of the aircraft; displaying, on a display device, first weather information (e.g., weather information 202) for the first waypoint (e.g., waypoint (GUP) 286) at a first altitude (e.g., altitude 3000 feet); and displaying, on the display device, second weather information (e.g., weather information 206) for the first waypoint at a second altitude (e.g., altitude 6000 feet) in a vertical situation display view and/or a lateral situation display view. The weather information may include any of the display elements discussed above. The method may include receiving and displaying user selected altitudes and altitude increments. The method may also include initiating and sending automated or semi-automated message requesting clearance for altitude modifications to the flight plan.

During flight, even in ideal situations, user attention is a limited resource. As such, exemplary embodiments display weather information in a manner that is intuitive and graphically integrated with flight plan, waypoints, and map reduces the user workload and increases situational awareness. Particularly, exemplary embodiments provide such graphics on vertical and lateral situation display views as a quick snapshot of the winds and temperature at different altitude levels and/or waypoints. Exemplary embodiments may also provide better correlation between the horizontal map display and the vertical profile display to enable the user to make better decisions requesting for special clearances and optimization of flight economy. Context switching may be reduced by integrating the weather information and clearance request messaging on both lateral map display and vertical profile display. In general, such weather symbology facilitates flight crew or operator situational awareness and vehicle control, which reduces pilot or operator workload and navigation errors, and thus results in increased aircraft and/or navigation safety.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
a processing unit configured to receive weather information associated with a flight path of a flight plan and to generate display commands based on the weather information, wherein the flight plan includes a first waypoint associated with a first altitude;
a display device coupled the processing unit and configured to receive the display commands and to display symbology representing the weather information, wherein the weather information includes first weather information for the first altitude, second weather information at a second altitude, different from the first altitude, and third weather information at a third altitude, different from the first and second altitudes; and
a user interface coupled to the processing unit and the display device, wherein the display device is configured to display a first menu with a plurality of altitude selections to a user and the user interface is configured to receive an altitude selection from the plurality of altitude selections on the first menu from the user, the plurality of altitude selections including at least a second altitude selection corresponding to the second altitude and a third altitude selection corresponding to the third altitude;
wherein the display device is configured to display at least one of the second weather information and the third weather information based upon the altitude selection, and
wherein the display device is configured to display a plurality of altitude increment selections to the user on the first menu and the user interface is configured to receive an altitude increment selection from the plurality of altitude increment selections on the first menu from the user, the display device displaying additional weather information at altitude increments based on the altitude increment selection.

2. The display system of claim 1, wherein the flight path includes a vertical flight path to the first waypoint, and wherein the display device is configured to display a vertical situation display view that includes the first weather information for the first altitude and the at least one of the second weather information and the third weather information based upon the altitude selection.

3. The display system of claim 2, wherein the first weather information for the first altitude includes wind direction, wind speed, and temperature for the first altitude at the first waypoint, the second weather information for the second altitude includes wind direction, wind speed, and temperature for the second altitude at the first waypoint, and the third weather information for the third altitude includes wind direction, wind speed, and temperature for the third altitude at the first waypoint.

4. The display system of claim 3, wherein the user interface is configured to receive a selection of a position on the flight plan other than the first waypoint from a user, and wherein, in response to the selection, the display device displays fourth weather information for the at least one of the second weather information and the third weather information based upon the altitude selection at the position on the flight plan.

5. The display system of claim 1, wherein the symbology representing the weather information includes wind direction expressed as degrees relative to true North.

6. The display system of claim 1, wherein the symbology representing the weather information includes wind direction expressed as an arrow indicating a tail wind or a head wind relative to the aircraft.

7. A display system for an aircraft, comprising:
   a processing unit configured to receive weather information associated with a flight path of a flight plan and to generate display commands based on the weather information, wherein the flight plan includes a first waypoint associated with a first altitude;
   a display device coupled the processing unit and configured to receive the display commands and to display symbology representing the weather information, wherein the weather information includes first weather information for the first altitude, second weather information at a second altitude, different from the first altitude, and third weather information at a third altitude, different from the first and second altitudes;
   a user interface coupled to the processing unit and the display device, wherein the display device is configured to display a first menu with a plurality of altitude selections to a user and the user interface is configured to receive an altitude selection from the plurality of altitude selections on the first menu from the user, the plurality of altitude selections including at least a second altitude selection corresponding to the second altitude and a third altitude selection corresponding to the third altitude,
   wherein the display device is configured to display at least one of the second weather information and the third weather information based upon the altitude selection, and
   wherein the display device is configured to display a plurality of altitude increment selections to the user on a second menu and the user interface is configured to receive an altitude increment selection from the plurality of altitude increment selections on the second menu from the user, the display device displaying additional weather information at altitude increments based on the altitude increment selection; and
   a communications unit coupled to the processing unit, the communications unit configured to selectively send a message requesting an altitude clearance to the second altitude or the third altitude based on the altitude selection.

8. The display system of claim 7, further comprising a user interface coupled to the processing unit, wherein the display device is configured to display menu with a message selection, such that, upon selection of the message selection, the communications unit sends the message requesting the altitude clearance to the second altitude.

9. The display system of claim 1, wherein the display device is configured to display a pop-up box with a wind correction angle and a track wind component of the altitude selection.

10. The display system of claim 1, wherein the display device is configured to render the at least one of the second weather information and the third weather information based upon the altitude selection in a color that indicates a temporal validity.

11. A method for displaying weather information on an aircraft, comprising:
    receiving a first user selection, via a user interface, of a first waypoint on a flight path of the aircraft;
    receiving a second user selection, via the user interface, for a second altitude or a third altitude from a first menu with a plurality of altitude selections corresponding at least to the second altitude and the third altitude;
    receiving a third user selection, via the user interface, for an altitude increment from a second menu with a plurality of altitude increment selections
    displaying, on a display device, first weather information for the first waypoint at a first altitude;
    displaying, on the display device, second weather information for the first waypoint for at least one of the second altitude or the third altitude based on the second user selection; and
    displaying, on the display device, additional weather information at altitude increments from the at least one of the second altitude or the third altitude based on the third user selection.

12. The method of claim 11, wherein the step of displaying, on the display device, the second weather information includes displaying wind direction, wind speed, and temperature at the second altitude.

13. The method of claim 11, wherein the displaying, on the display device, the second weather information, includes displaying the second weather information on a vertical situation display view.

14. The method of claim 11, wherein the displaying, on the display device, the second weather information, includes displaying the second weather information on a lateral situation display view.

15. The method of claim 11, further comprising a step of sending, in response to a second user selection, a message requesting an altitude clearance to the second altitude.

* * * * *